United States Patent [19]
Santilli

[11] 3,808,685
[45] May 7, 1974

[54] SPROCKET DRIVEN ANNULAR SAW

[76] Inventor: Ruggero Santilli, 74 Bakers Hill Rd., Weston, Mass. 02193

[22] Filed: Aug. 16, 1972

[21] Appl. No.: 280,978

[52] U.S. Cl. .................. 30/389, 83/491, 74/243 R
[51] Int. Cl. ............................................. B27b 5/14
[58] Field of Search ..... 30/389; 83/491; 74/243 CS, 74/243 R

[56] References Cited
UNITED STATES PATENTS

| | | | |
|---|---|---|---|
| 2,972,363 | 2/1961 | Santilli | 30/389 |
| 3,884,798 | 5/1959 | Wilson | 74/243 CS |
| 3,354,737 | 11/1967 | Wright | 74/243 CS |
| 2,804,105 | 8/1957 | Stone | 83/491 |

Primary Examiner—Donald R. Schran
Attorney, Agent, or Firm—Pugh & Laiche

[57] ABSTRACT

The invention relates to a sprocket driven annular saw and, in particular, a sprocket that utilizes the saw teeth to rotate the annular saw blade. The sprocket contains rollers which are rotatable around their own axis to minimize or eliminate frictional forces. Clearance is also provided between the sprocket rollers and the saw blade to prevent loading of the saw blade by saw dust and chips. A specific saw tooth contour is provided to further minimize spurious forces.

7 Claims, 5 Drawing Figures

SPROCKET DRIVEN ANNULAR SAW

The subject matter of this invention is related to the annular power saw described in the co-pending U.S. Patent Application, Ser. No. 166,783, filed on July 28, 1971. The subject matter of the co-pending application deals with an annular power saw in which the driving forces and the workpiece resistance forces were balanced to provide static and dynamic equilibrium. The co-pending application deals with a friction drive mechanism. A sprocket drive introduces forces which tend to upset the balance.

In prior art devices, extraneous forces generated by a sprocket drive was of little consequence because the annular saw blade was generally supported for more than one half of the saw blade perimeter and did not require or provide dynamic equilibrium. This is believed to be the first instance where a sprocket drive is associated with an annular saw blade that is supported for less than one half of its perimeter. This is also believed to be the first instance where a sprocket drive is designed to provide dynamic equilibrium.

After some study, it appeared that the use of a sprocket drive mechanism of a conventional type tended to upset the delicate dynamic equilibrium forces to the detriment of the smooth and efficient operation of the heretofore dynamically balanced annular saw. The sprocket also presented initially a loading problem in terms of the interaction between the sprocket roller and its mating groove as well as the need for an efficient ejection of saw dust.

It is an object of the invention to provide a sprocket driven annular power saw which includes means for providing dynamic equilibrium of the power saw and particularly the annular saw blade.

It is another object of the invention to provide a sprocket driven annular power saw which is configured so that the sprocket drive introduces negligible or no spurious forces affecting the dynamic equilibrium.

It is another object of the invention to provide a sprocket driven annular saw in which the rollers of the sprocket are rotatable about their own axis to minimize frictional forces and wear.

It is yet another object of the invention to provide a sprocket driven annular power saw in which the sprocket meshes with a slot constructed as part of the saw tooth configuration, a clearance is provided between the sprocket roller and the bottom of the groove to prevent loading of the saw blade and efficient ejection of saw dust.

It is yet another object of the invention to provide a sprocket driven annular power saw in which the saw tooth which meshes with the sprocket is configured to develop driving forces that tend to dynamically balance the saw blade.

It is still another object of the invention to provide a saw tooth configuration which includes a lip at the forward edge of a saw tooth to aid in the removal of saw dust.

In accordance with the invention, a sprocket driven annular saw comprises a saw blade having a plurality of spaced circumferential teeth; and a sprocket comprising a plurality of circumferential rollers. A roller fits into a slot between a pair of adjacent teeth engaging an edge of tooth fOr driving the saw blade, each of said rollers being rotatable about its axis.

Also in accordance with the invention, a clearance is provided between the sprocket rollers and the bottom of the groove between adjacent saw teeth to prevent loading of the saw blade by saw dust.

The driven edge of a saw tooth is configured to complement the movement of a roller while at the same time develop driving forces that are directed to establish dynamic equilibrium of the saw blade.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
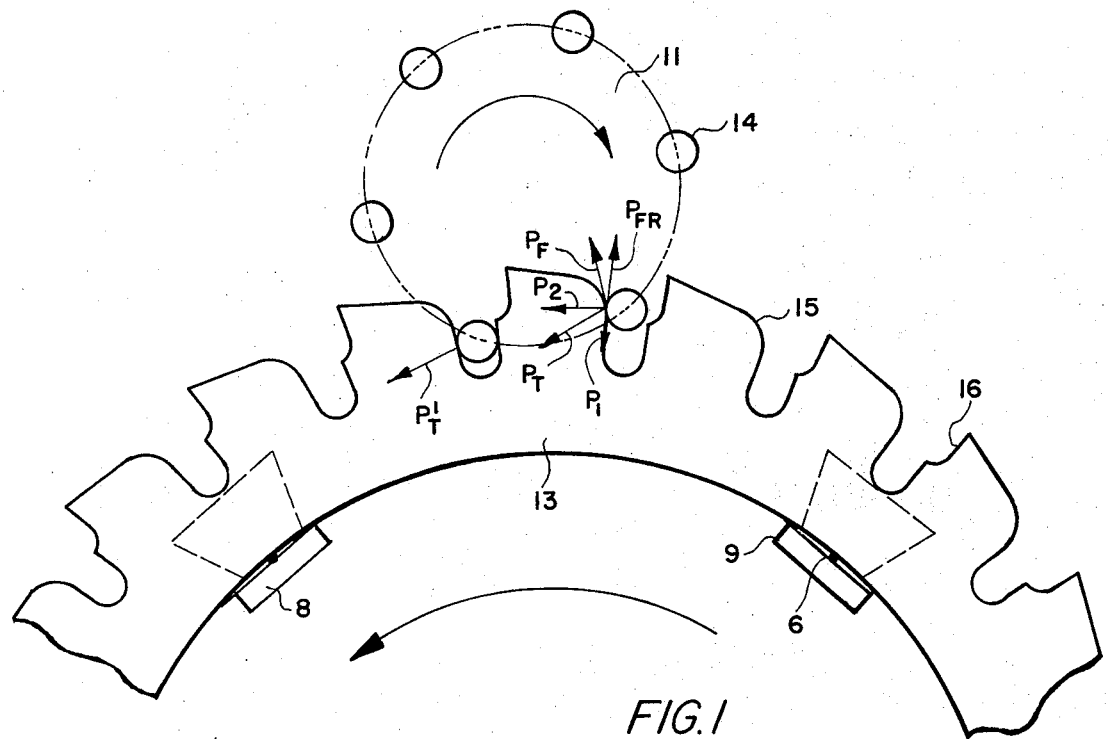
FIG. 1 is a schematic representation of a sprocket driven annular saw blade with forces depicted therein.

In FIG. 1, sprocket 11 engages the teeth 12 of a saw blade 13. The saw blade 13 is supported for less than one half of its periphery by rollers 8 and 9. In FIG. 1, the force $P_T$ and its respective radial and tangential components, $P_1$ and $P_2$, in a balanced saw create torques about a pivot 6. These balance the torques of the workpiece resistance forces resulting from the cutting action of the saw and provide for a dynamic equilibrium that, in turn, provides stability. See said co-pending application. Therefore, an important consideration with regard to such annular saws is to avoid spurious forces which upset the equilibrium and which reduce stability, cutting performance and ease of handling.

The arrows labeled $P_T$ and $P_T'$ are the driving forces on the saw blade 13 which provide useful work and equilibrium as previously described. The arrow marked $P_F$ represents the friction force produced on the saw tooth 12 by a roller 14 of the sprocket 11.

Figure 2A:
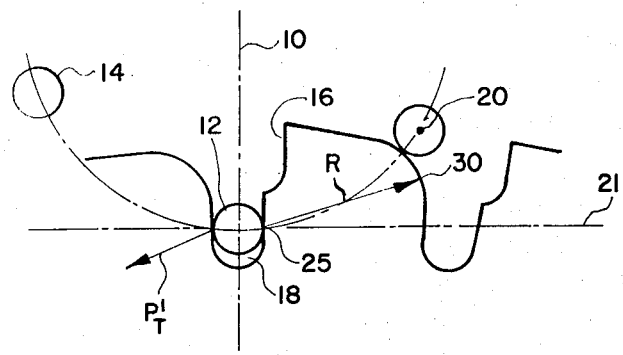
FIG. 2A shows a sprocket roller at the lowest point of its travel within complementary grooves in the saw blade.
Figure 2B:
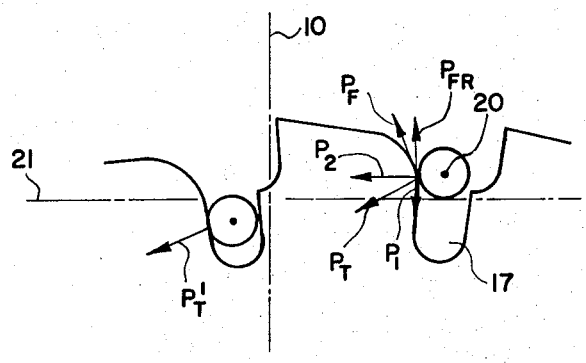
FIG. 2B shows the position and forces associated with the position of the rollers in an intermediate position.
Figure 2C:
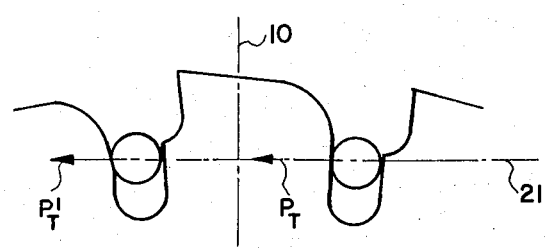
FIG. 2C shows a pair of rollers in a symmetrical position about the axis joining the centers of the saw blade and sprocket.

Referring to FIGS. 2A through 2C briefly, it will be noted that in all points of contact between the rollers of the sprocket and the saw teeth 13--except for the short instant when a pair of rollers are symmetrical with the axis 10 joining the centers of the saw blade 13 and the sprocket 11--the forces $P_T$ and $P_T'$ are directed into the domain defined by the axis 10 and the perpendicular 21 to the axis 10 which passes through the centers of a pair of rollers 14 when the rollers are positioned in a symmetrical relationship relative to the axis 10. Since the driving forces $P_T$ are always in this domain, they provide the desired equilibrium torques that stabilize the saw blade 13.

It is also clear from the FIG. 1 drawing that the force $P_F$, particularly its "radial" component $P_{FR}$, act counter to $P_2$ and thereby tend to upset the saw balance.

The spurious friction force $P_F$ is eliminated or minimized to a negligible magnitude by allowing the roller 14 to rotate about its own axis along the rear edge 15 of a saw tooth 12.

Referring to FIG. 2A, there is shown a roller 14 at the bottom-most point of its travel in full engagement with the slot 17, the space between the adjacent saw teeth 12. The slot 17 is dimensioned so that the roller 14 engages the forward edge 16 and the rear edge 15 of adjacent saw teeth 12 to maximize power transfer and to minimize noise and clatter.

The slot 17 includes a clearance space 18 which is defined by the roller 14 and the bottom of the slot 17. This clearance 17 is critical to prevent radial forces on the saw blade by a roller through packed saw dust deposited between the roller 14 and the bottom of the slot. The space between adjacent saw teeth 12 also includes a rearwardly extending lip 19 which accelerates the expulsion of saw dust from the saw during the cutting action of the saw teeth. This mode of loading is eliminated.

It is noted in FIG. 2A that the force acting on the forward saw tooth 12 is a force $P_T'$ directed into the previously described domain. In FIG. 2A the relative positions of the rollers 14 and the saw teeth 12 is such that a second roller 14 is just coming in contact with the top of the rear edge 15 of the next tooth 12. At the moment of contact, $P_F$ is generated. In accordance with the concept of making the roller 14 rotatable about its axis, the force $P_F$ is negligible or eliminated, but in any event, does not upset the balance generated by the force $P_T$ and its components, $P_1$ and $P_2$, generated by this roller. $P_T$ is also directed into the proper domain. It follows that the resultant force of combining $P_T$ and $P_T'$ (not shown) will also be directed in the desired deomain.

In FIG. 2B a slight counterclose rotation has taken place. The forces are as noted. Note particularly the direction of $P_{FR}$ in opposition to $P_2$, the stabilizing component of $P_T$. This further serves to illustrate the Applicant's objective of reducing or minimizing $P_F$ by allowing the roller 14 to rotate about its axis.

In FIG. 2C, a further slight rotation of the saw has taken place to the point where the rollers 14 are symmetrical with respect to the axis 10.

The center 20 of the roller 14' follows a circular path as the sprocket rotates. The radius R in FIG. 2A is defined by the distance between the points 25 and 30. Point 25 is the point of contact of a roller on the forward edge 16 at the lowest point of its travel. Point 30 is the point a roller contacts on the rear edge 15 of a tooth 12. The shape of edge 15 approximately complements the path generated by the point 20. The shape of edge 15 also assures that the driving force $P_T$ is always directed into the domain defined by the axes 10 and 20.

Figure 3:
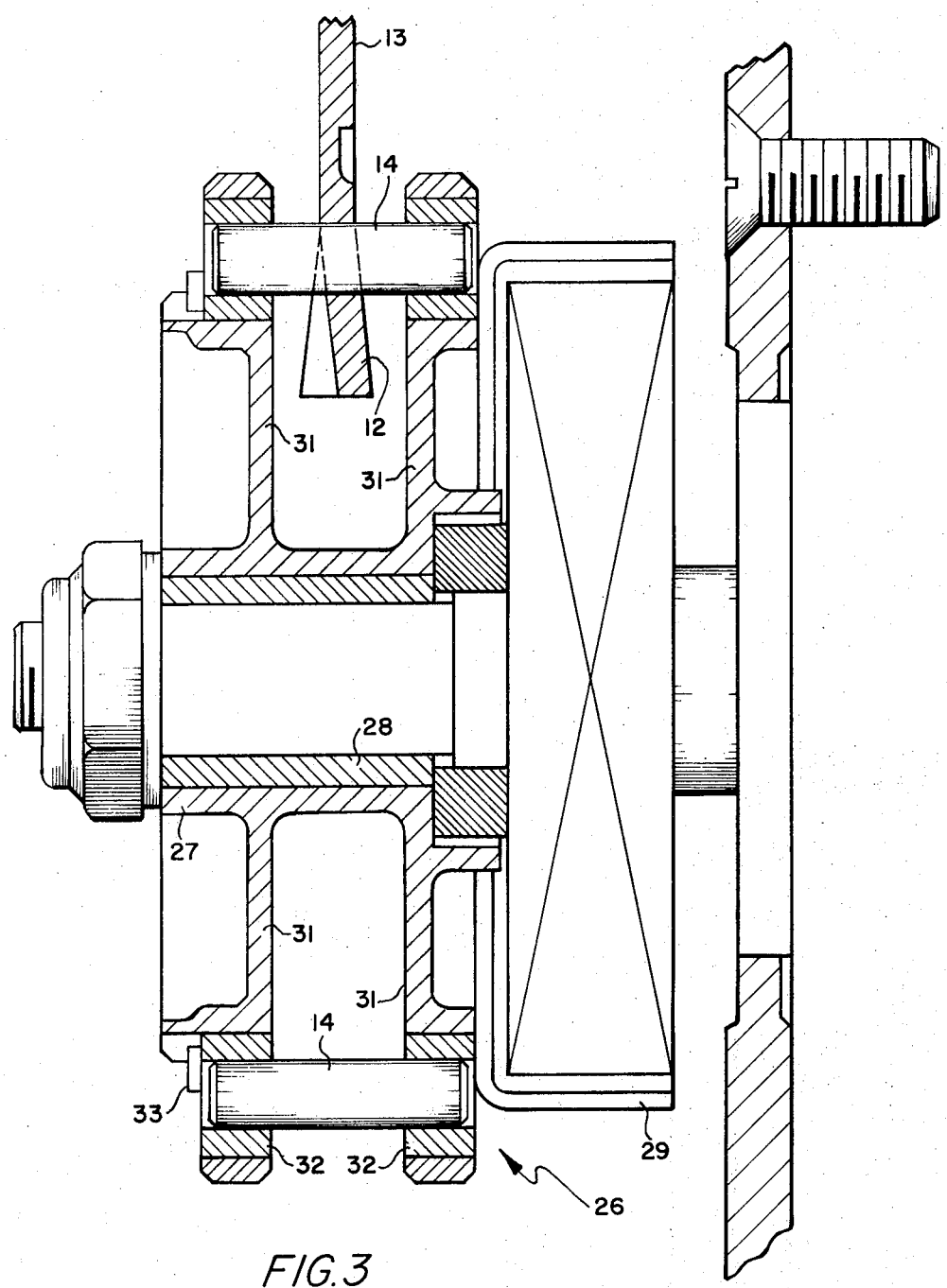
FIG. 3 is a cross-sectional representation of a sprocket drive embodying the principles of the present invention.

Referring to FIG. 3 of the drawings, there is shown a sprocket 26. The sprocket includes a webbed housing 27 comprising a core 28 adapted and used for securing the sprocket 26 to the driven member of a clutch 29. Extending from the center 28 are two webbed and spaced flanges 31. Each flange is terminated in a bearing 32 in which a roller 14 is positioned.

In the FIG. 3 structure, the roller 14 is contained within the sprocket 26 at one end by the driven member 29 of the clutch. The roller 14 is contained with the bearings 32 at the other end by a removeable ring 33. Clearly, to fulfill the purpose of this invention, the rollers 14 are rotatably housed between bearings 32 so that it may rotate freely about its longitudinal axis.

Any one or all of the rollers 14 may be removed by removing the ring 33 as is clearly evident by the drawing FIG. 3.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. A sprocket driven annular saw comprising:
   an annular saw blade having a plurality of spaced circumferential teeth; and
   a sprocket comprising a plurality of rollers, said rollers for fitting into a slot between adjacent teeth for engaging a tooth for rotating the saw blade, each of said rollers being rotatable about the axis of said sprocket in a circular path, each of said teeth having a continuous convex driven edge starting near the peripheral edge of the saw blade and extending inwardly to form a marginal edge of a slot, said convex edge being configured to complement the path of a roller to maintain continuous contact with said roller from initial contact adjacent to the periphery of the saw blade to separation near the bottom of the slot.

2. A sprocket driven annular saw as defined in claim 1 wherein said rollers are supported by a bearing at each end.

3. A sprocket driven annular saw as defined in claim 1 wherein each roller is removably contained in said sprocket.

4. A sprocket driven annular saw as defined in claim 1 wherein all of said rollers are secured in the sprocket by a detachable ring.

5. A sprocket driven annular saw as defined in claim 1 wherein said slot between adjacent teeth includes a clearance space between the lowest part of travel of a roller and the bottom of said space, to prevent radial loading of a saw blade by a roller or compacted saw dust.

6. A sprocket driven annular saw as defined in claim 1 wherein said slot between adjacent teeth is partially defined by an intermediately spaced rearwardly extending lip on the front edge of a saw tooth.

7. A sprocket driven annular saw as defined in claim 1 wherein the radius measured from the lowermost point of contact by a roller on the front edge of a tooth to the rear edge of said tooth complements the path taken by a point on the axis, the point of contact of a roller.

* * * * *